United States Patent [19]

Drews

[11] Patent Number: 4,766,893
[45] Date of Patent: Aug. 30, 1988

[54] EMERGENCY OXYGEN SUPPLY UNIT WITH A RESPIRATOR

[75] Inventor: Wolfgang Drews, Bahrenhof, Fed. Rep. of Germany

[73] Assignee: Drägerwerk Aktiengesellschaft, Fed. Rep. of Germany

[21] Appl. No.: 40,936

[22] Filed: Apr. 21, 1987

[30] Foreign Application Priority Data

Apr. 24, 1986 [DE] Fed. Rep. of Germany ....... 3613814

[51] Int. Cl.$^4$ ............................................. A62B 7/00
[52] U.S. Cl. ........................... 128/201.29; 128/202.14; 128/204.18
[58] Field of Search ...................... 128/201.23, 201.29, 128/202.11, 202.13, 205.22, 204.18, 202.14

[56] References Cited

U.S. PATENT DOCUMENTS

| | | | |
|---|---|---|---|
| 1,090,742 | 3/1914 | Moran | 128/201.29 |
| 2,881,758 | 4/1959 | Motsinger | 128/201.29 |
| 3,080,586 | 3/1963 | Steinke | 128/202.14 X |
| 3,536,071 | 10/1970 | Ferrando | 128/202.14 |
| 4,221,216 | 9/1980 | Kranz | 128/201.23 |
| 4,685,456 | 8/1987 | Smart | 128/204.18 X |

Primary Examiner—Alan Cohan
Attorney, Agent, or Firm—McGlew and Tuttle

[57] ABSTRACT

An emergency supply unit with a respirator for oxygen supply to air passengers contains an $O_2$-delivering supply unit and a mask, which are received in an openable housing. After removal from the housing the parts form an independent unit which is ready for versatile mobile use. The oxygen unit and the mask are mounted on a housing part which is detachably connected with the housing body and provided with a carrying strap.

4 Claims, 2 Drawing Sheets

EMERGENCY OXYGEN SUPPLY UNIT WITH A RESPIRATOR

BACKGROUND OF THE INVENTION

1. Field of the Invention

This invention relates in general to devices for supplying a breathing gas to individuals and in particular to a new and useful emergency oxygen supply unit which is readily accessible for stationery and mobile use.

The invention relates particularly to an emergency supply unit with a respirator for oxygen supply to air passengers which contains an $O_2$-delivering supply unit and a mask, which are received in an openable housing.

A similar oxygen supply unit has become known from DE-OS No. 31 22 225. In the known device the separate parts thereof are lodged in a housing which is installed, for example, in the arm rest of a seat for the air passengers. Upon pressure drop in the cabin, the oxygen supply to the passengers must occur via this respirator. To this end, a flap of the housing is opened, and the parts of the respirator, consisting of an oxygen generator and a mask, can be extracted via a slide. The mask is removed and put on, so that autonomous breathing becomes possible.

The known respirator has the disadvantage that the passenger can be supplied with oxygen only as long as he is seated on the seat. If in an emergency escape of the passengers from the airplane becomes necessary, there is no continuation of the oxygen supply.

Another respirator for aircraft is known from DE-U-No. 1 538 231. In this case, all devices necessary for autonomous oxygen supply to the passengers are lodged in a housing which can be carried like a suitcase and which, for stationery use, is secured at a suitable point in the passenger cabin space.

Such respirators, however, require much space in the ready state and are unsuitable for mobile use as the passenger must carry the respirator in a suitcase.

SUMMARY OF THE INVENTION

The present invention provides an improved emergency supply unit which, after removal from the housing, is usable as an independent unit and is ready for versatile mobile use.

According to the invention the supply unit and the mask are mounted on a housing part which is detachably connected with the housing body and is provided with a carrying strap.

An advantage of the invention is that the emergency supply unit is available to the air passenger as a compact unit for stationery use inside an airplane cabin, and all he has to do, is to press the mask onto his nose and mouth region in order to be able to be supplied with oxygen. Since all apparatus parts serving for oxygen supply are available to every passenger, he is easily able, if needed, when escape from the passenger cabin space becomes necessary, to fasten the detached housing part, such as a cover, on his back by means of the carrying strap, so that he retains full freedom of movement while being supplied with oxygen.

As protection from damage during use or escape, it may advantageously by provided to envelop the separate parts of the emergency supply unit with a latticework or holder, so that the cover and the latticework forms a closed and shock-protected container.

If during an emergency there is, in addition, creation of smoke whereby mucous membranes of the eyes might be irritated or similar harmful effects in the head region are to be feared, the mask is advantageously provided with a smoke protection hood.

For cases in which the aircraft must make an emergency landing over water, the smoke protection hood may be provided with a collar to which a lifesaver vest is fitted.

Depending on available accomodation places, the emergency supply unit may be arranged in the ceiling area above the passenger seat in a housing. In case of pressure drop in the cabin, the cover is opened and the respiration mask drop automatically. For subsequent mobile use of the emergency supply unit the cover, together with the other separate parts, is then detachable from the housing and can be strapped on by the passenger. Other possible accomodations are in the (arm) rests of the seats or underneath the seats.

Accordingly it is an object of the invention to provide a device for supplying breathing gases to personnel in an easily accessible manner and to provide an arrangement in which the personnel may use it in a mobile operation.

A further object of the invention is to provide a device for carrying an oxygen supply which includes a housing which has a part such as a cover which provides a mouth for an oxygen supply device, a connecting hose and a breathing mask which advantageously combines a cover or other part of a housing which may be easily removed and carried away.

A further object of the invention is to provide a device for supplying oxygen in emergency conditions which includes a breathing mask and an arrangement for carrying a life preserver vest at the mask for transporting the oxygen if necessary.

A further object of the invention is to provide a device for emergency supply of a breathing gas which is simple in design, rugged in construction and economical to manufacture.

There is more than one embodiment.

GENERAL DESCRIPTION OF THE PREFERRED EMBODIMENTS

Figure 1:
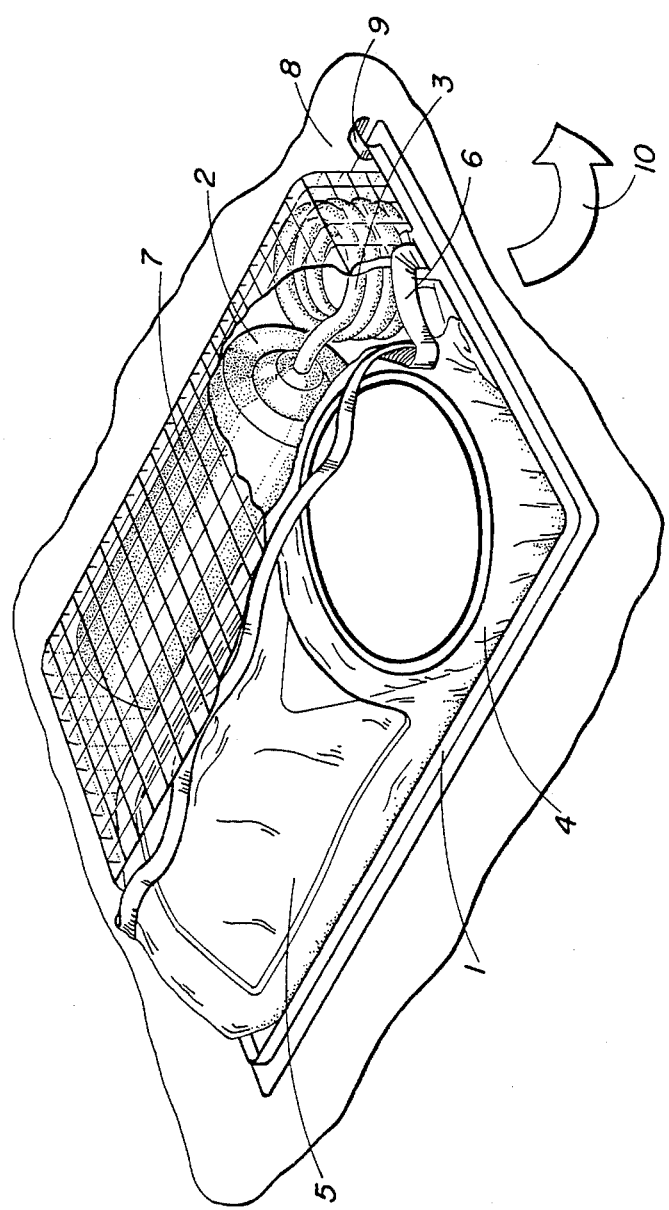
FIG. 1 is a perspective view of an emergency oxygen supply unit.

Referring to the drawings in particular the invention embodied therein comprises an emergency oxygen supply unit which includes a housing 8 having a detachable part or cover 1. In accordance with the invention an oxygen supply unit 2 is mounted on the housing part 1 along with a mask 4 which may be connected to the oxygen through a hose 3 all of which are mounted on the removeable cover 1. In accordance with a feature of the invention the cover is provided with a carrying strap 6 which permits the cover to be moved around with the oxygen device 2 in the event that the wearer of the device must move away from the station having the housing body 8.

In FIG. 1 is shown the emergency supply unit, the separate parts of which are mounted on a support (1), which may be, for example, a housing cover. The separate parts include an oxygen-deliverying supply unit (2), for example an oxygen tank or bottle or an oxygen-delivering chemical in an appropriate housing, as well as of a connecting hose (3) between the oxygen source and a mask (4). On the support is located further a smoke protection hood (5) which is connected with the mask (4). At a suitable point there are fastened on the support (1) neck straps (6) which permit carrying the emergency supply unit in case of escape. All separate parts mounted on the support (1) are enclosed by a holder of wire mesh (7) secured to cover (1). This wire mesh holder (7) contains on one side an opening for removal of the mask (4) with its smoke protection hood (5). The support (1) may be recessed for example in a housing (8), which in the represented form is only partially indicated. The emergency supply unit thus formed is arranged to be pivotable and detachable out of the housing (8) in the direction of arrow (10) via the detachable hinges (9).

Figure 2:
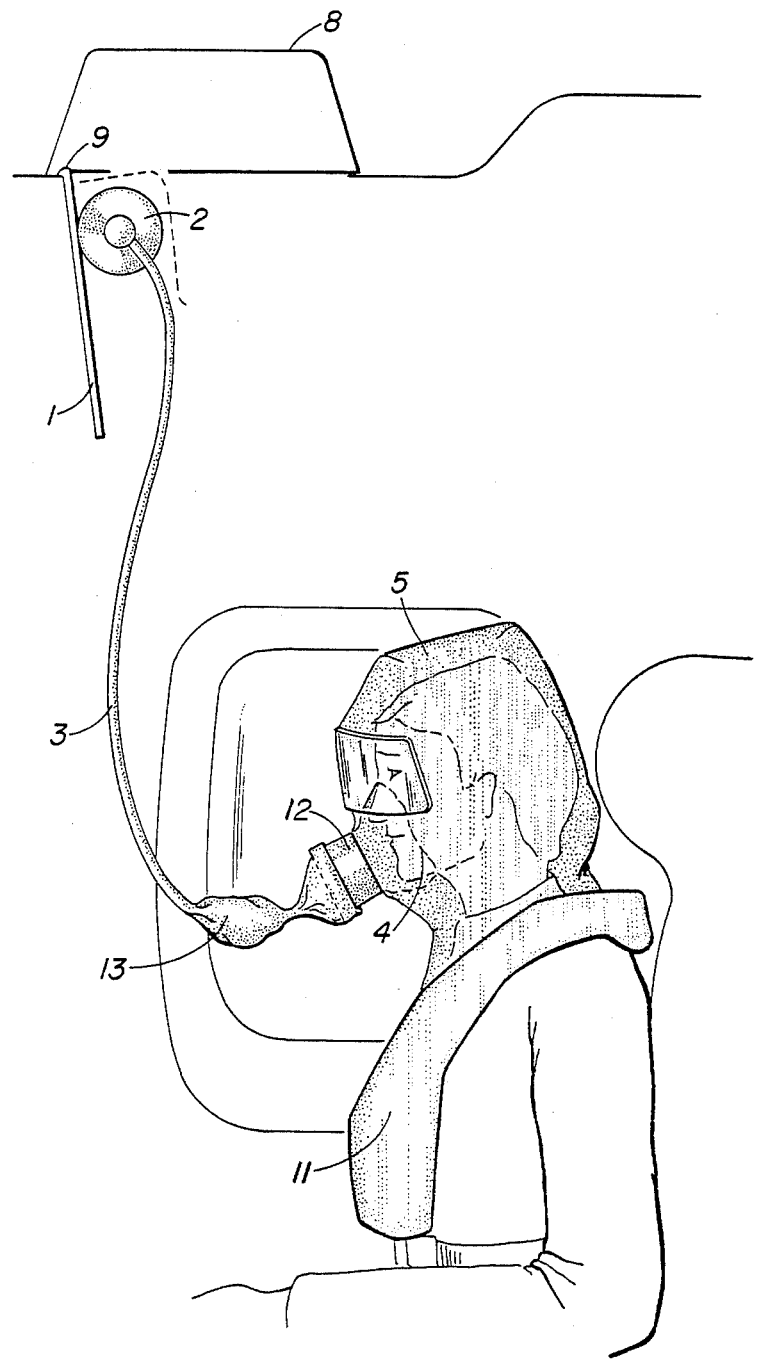
FIG. 2 is an elevational view of an aircraft of the donner emergency supply unit with smoke protection hood and lifesaver vest.

In FIG. 2, an emergency supply unit is illustrated where the smoke protection hood (5) together with a lifesaver vest (11) fastened on it is placed over the head and neck region as well as the shoulder and chest region of an air passenger. Via a filter (12) and a breathing bag (13) the mask (4) is connected to the oxygen source (2) by the connecting hose (3).

What is claimed is:

1. An emergency supply unit, comprising a housing having a detachable part, an oxygen supply unit mounted on said detachable part, a mask mounted on said detachable part which is connectible to said oxygen supply unit, and a carrying strap associated with said detachable part, wherein said housing includes a trough-shaped member, said detachable part comprising a cover hinged to said member, said cover being foldable downwardly out of said member on said hinge connection, said oxygen unit being secured to said cover and having a hose portion extending outwardly therefrom and downwardly when said cover is opened, said mask being removable with said hose portion to position it on a wearer's head, and a life preserver encompassing the wearer's shoulder and secured to said mask.

2. An emergency oxygen supply unit according to claim 1 including a holder secured to said detachable part and enveloping said oxygen supply unit and said mask.

3. An emergency oxygen supply unit according to claim 1 wherein said mask includes a smoke protection hood portion engageable over the wearer's head.

4. An emergency oxygen supply unit according to claim 3 wherein said smoke protection hood has a collar with a life saver vest.

* * * * *